United States Patent
Porebski et al.

(10) Patent No.: US 12,154,706 B2
(45) Date of Patent: Nov. 26, 2024

(54) POWER CABLE ASSEMBLY FOR A POWER DISTRIBUTION SYSTEM HAVING AN INTEGRATED COOLING SYSTEM

(71) Applicant: Aptiv Technologies AG, Schaffhausen (CH)

(72) Inventors: Grzegorz Porebski, Podłże (PL); Monika Pieszka-Lyson, Cracow (PL); Dominik Kawalec, Brzoskwinia (PL); Pawel Kozak, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/876,343

(22) Filed: Jul. 28, 2022

(65) Prior Publication Data

US 2023/0030269 A1 Feb. 2, 2023

(30) Foreign Application Priority Data

Jul. 30, 2021 (EP) ..................... 21188859

(51) Int. Cl.
*H01B 7/42* (2006.01)
*B60L 53/18* (2019.01)
(Continued)

(52) U.S. Cl.
CPC .............. *H01B 7/423* (2013.01); *B60L 53/18* (2019.02); *B60L 53/302* (2019.02); *H01B 9/006* (2013.01)

(58) Field of Classification Search
CPC . H01B 7/30; H01B 7/42; H01B 7/421; H01B 7/423; H01B 7/28; H02K 5/22; H02K 11/33
(Continued)

(56) References Cited

U.S. PATENT DOCUMENTS

| 4,690,204 A | 9/1987 | Reichel et al. |
| 5,670,860 A | 9/1997 | Conrady et al. |

(Continued)

FOREIGN PATENT DOCUMENTS

| CA | 2096360 C | 2/2002 |
| CN | 203450055 U | 2/2014 |

(Continued)

OTHER PUBLICATIONS

Extended European Search Report for Application No. 21188859.9; dated Jan. 24, 2022., 12 pages.

*Primary Examiner* — William H. Mayo, III
(74) *Attorney, Agent, or Firm* — Billion & Armitage

(57) ABSTRACT

A power cable assembly and a power distribution system incorporate an integrated cooling system. The power cable assembly includes a power cable core having an electrical conductor, an electrical conductor extending longitudinally, a plurality of longitudinally extending cooling pipes, and a thermal interface material (TIM) surrounding the cooling pipes and electrical conductor. The TIM is configured to thermally couple an external surface of the thermally conductive wall of each cooling pipe with an external surface of the insulating material of the electrical conductor such that the heat generated at the electrical conductor is transferred to the coolant medium circulating in the interior channel via the external surface of the cooling pipes over a heat transfer region.

17 Claims, 4 Drawing Sheets

(51) Int. Cl.
*B60L 53/302* (2019.01)
*H01B 9/00* (2006.01)

(58) Field of Classification Search
USPC ............... 174/15.1, 15.2, 17 LF, 21 R, 22 R
See application file for complete search history.

(56) References Cited

U.S. PATENT DOCUMENTS

| | | | |
|---|---|---|---|
| 6,825,584 | B2 | 11/2004 | Kulig et al. |
| 9,701,210 | B2 | 7/2017 | Woo et al. |
| 10,109,395 | B2 | 10/2018 | Beimdieck et al. |
| 10,766,374 | B2 | 9/2020 | Heyne et al. |
| 10,800,276 | B2 | 10/2020 | Grienitz et al. |
| 10,811,170 | B2 | 10/2020 | Gontarz et al. |
| 2013/0269966 | A1* | 10/2013 | Emme ................ H01B 7/423 |
| | | | 174/15.6 |
| 2017/0144558 | A1* | 5/2017 | Remisch ............ B60L 53/302 |
| 2018/0277283 | A1* | 9/2018 | Remisch ............. B60L 53/16 |
| 2018/0304757 | A1 | 10/2018 | Vaughan |
| 2019/0214161 | A1 | 7/2019 | Chen et al. |
| 2019/0237218 | A1 | 8/2019 | Heyne et al. |
| 2019/0308519 | A1 | 10/2019 | Tsukamoto |
| 2019/0385765 | A1* | 12/2019 | Lyon ................ H01B 7/423 |
| 2020/0343022 | A1 | 10/2020 | Tasiopoulos et al. |
| 2020/0361327 | A1 | 11/2020 | Heyne et al. |
| 2020/0373038 | A1* | 11/2020 | De Rai ............. H01B 7/423 |

FOREIGN PATENT DOCUMENTS

| | | | | |
|---|---|---|---|---|
| CN | 204695848 | U | * 10/2015 | |
| CN | 106782835 | A | 5/2017 | |
| CN | 106849227 | A | 6/2017 | |
| CN | 106849228 | A | 6/2017 | |
| CN | 106849238 | A | 6/2017 | |
| CN | 206314142 | U | 7/2017 | |
| CN | 107082030 | A | 8/2017 | |
| CN | 206697276 | U | 12/2017 | |
| CN | 206741986 | U | 12/2017 | |
| CN | 107640046 | A | 1/2018 | |
| CN | 206864231 | U | 1/2018 | |
| CN | 207082683 | U | 3/2018 | |
| CN | 107933340 | A | 4/2018 | |
| CN | 207374157 | U | 5/2018 | |
| CN | 108199162 | A | 6/2018 | |
| CN | 108372794 | A | 8/2018 | |
| CN | 108377633 | A | 8/2018 | |
| CN | 108461188 | A | 8/2018 | |
| CN | 108461952 | A | 8/2018 | |
| CN | 108597654 | A | 9/2018 | |
| CN | 108878014 | A | 11/2018 | |
| CN | 108922658 | A | 11/2018 | |
| CN | 208093243 | U | 11/2018 | |
| CN | 208111849 | U | 11/2018 | |
| CN | 208189243 | U | 12/2018 | |
| CN | 208263991 | U | 12/2018 | |
| CN | 109148015 | A | 1/2019 | |
| CN | 109215872 | A | 1/2019 | |
| CN | 109323496 | A | 2/2019 | |
| CN | 208460422 | U | 2/2019 | |
| CN | 208538552 | U | 2/2019 | |
| CN | 208539163 | U | 2/2019 | |
| CN | 208706298 | U | 4/2019 | |
| CN | 208753040 | U | 4/2019 | |
| CN | 109788713 | A | 5/2019 | |
| CN | 109935415 | A | 6/2019 | |
| CN | 109969022 | A | 7/2019 | |
| CN | 110014954 | A | 7/2019 | |
| CN | 110098011 | A | 8/2019 | |
| CN | 110136877 | A | 8/2019 | |
| CN | 209489044 | U | 10/2019 | |
| CN | 110416777 | A | 11/2019 | |
| CN | 209747218 | U | 12/2019 | |
| CN | 209804304 | U | 12/2019 | |
| CN | 209912570 | U | 1/2020 | |
| CN | 209962721 | U | 1/2020 | |
| CN | 111016707 | A | 4/2020 | |
| CN | 111048247 | A | 4/2020 | |
| CN | 210295942 | U | 4/2020 | |
| CN | 111106488 | A | 5/2020 | |
| CN | 111200200 | A | 5/2020 | |
| CN | 210516261 | U | 5/2020 | |
| CN | 210640035 | U | 5/2020 | |
| CN | 210805262 | U | 6/2020 | |
| CN | 211237803 | U | 8/2020 | |
| CN | 211294720 | U | 8/2020 | |
| CN | 211295493 | U | 8/2020 | |
| CN | 211479709 | U | 9/2020 | |
| CN | 211592278 | U | 9/2020 | |
| CN | 211605534 | U | 9/2020 | |
| CN | 211641866 | U | 10/2020 | |
| CN | 212073704 | U | 12/2020 | |
| CN | 107425323 | B | 7/2022 | |
| DE | 3627149 | C2 | 4/1993 | |
| DE | 102011014908 | A1 | 11/2011 | |
| DE | 202017102535 | U1 | 5/2018 | |
| DE | 102018113450 | A1 | 12/2019 | |
| DE | 102019114765 | B3 | 10/2020 | |
| EP | 0715391 | A1 | * 6/1996 | ............... H02J 7/02 |
| EP | 0562331 | B1 | 9/1997 | |
| EP | 0824285 | B1 | 3/2000 | |
| EP | 2637179 | A1 | 9/2013 | |
| EP | 3043421 | A1 | 7/2016 | |
| FR | 2935475 | A1 | 3/2010 | |
| FR | 3050192 | A1 | 10/2017 | |
| JP | 2020182298 | A | 11/2020 | |
| KR | 20090103405 | A | 10/2009 | |
| KR | 20200030929 | A1 | 3/2020 | |
| KR | 102120306 | B1 | 6/2020 | |
| WO | 2012079631 | A1 | 6/2012 | |
| WO | 2017081050 | A1 | 5/2017 | |
| WO | 2017162464 | A1 | 9/2017 | |
| WO | 2017162651 | A1 | 9/2017 | |
| WO | 2018060151 | A1 | 4/2018 | |
| WO | 2019062974 | A1 | 4/2019 | |
| WO | 2019184882 | A1 | 10/2019 | |
| WO | 2019224267 | A2 | 11/2019 | |
| WO | 2020002485 | A1 | 1/2020 | |
| WO | 2020053104 | A1 | 3/2020 | |
| WO | 2020114888 | A1 | 6/2020 | |

* cited by examiner

POWER CABLE ASSEMBLY FOR A POWER DISTRIBUTION SYSTEM HAVING AN INTEGRATED COOLING SYSTEM

CROSS-REFERENCE TO RELATED APPLICATION

This application claims benefit of priority to European Patent Application No. 21188859.9 filed on Jul. 30, 2021, the entire disclosure of which is hereby incorporated by reference.

TECHNICAL FIELD OF THE INVENTION

The present application relates in general to a power cable assembly, and more particularly, to a high voltage power cable assembly for a power distribution system incorporating an integrated cooling system.

BACKGROUND

Charging of high voltage batteries, for example, in the field of automotive technology, requires the use of heavy gauge high voltage power cables that can handle the level of current required to ensure fast charging. The HV power cables used in battery charging applications and/or power distribution applications are usually provided with a cooling system to ensure that the heat generated at the electrical conductor due to the high current flow is dissipated away, thereby increasing the efficiency and safety of the charging operation.

In one existing approach of the prior art, passive cooling solutions may be applied to reduce the temperature dissipated by an HV power cable. However, passive cooling solutions are limited due to manufacturing and weight constraints. For example, changing the dimensions of the components, e.g., increase the electrical conductor gauges to reduce temperature, would increase the weight and cost of the power cable assembly while reducing its flexibility.

Examples of known cable cooling systems are described in KR102120306 and WO201860151. Typically, known power cable assemblies use one or more busbars to carry the electrical power and large heat sinks or air-cooling units that are designed to dissipate the heat generated during operation at the busbar.

Therefore, there is a need to provide a power cable assembly with an improved cooling system that addresses the above noted problems.

SUMMARY

It is an aim of the present disclosure to provide an improved power cable assembly with a cooling system and a power distribution system incorporating the improved power cable assembly.

According to an aspect of the present disclosure, a power cable assembly is provided including a power cable core having an electrical conductor extending longitudinally. The electrical conductor contains an electrically conductive core surrounded by an insulating material. The power cable core additionally has a plurality of longitudinally extending cooling pipes. Each cooling pipe has a thermally conductive wall defining an interior channel for circulating, between a coolant inlet and a coolant outlet of the cooling pipes, a coolant medium. The power cable core further has a thermal interface material (TIM) surrounding the cooling pipes and the electrical conductors. The TIM is configured to thermally couple an external surface of the thermally conductive wall of each cooling pipe with an external surface of the insulating material of the electrical conductor such that the heat generated at the electrical conductor is transferred, via the external surface of the cooling pipes over a heat transfer region, to the coolant medium circulating in the interior channel. The power cable core also has an insulating layer surrounding the power cable core. The plurality of cooling pipes is arranged about the electrical conductor such that a portion of an external surface of the thermally conductive wall of each cooling pipe is in direct contact with a corresponding portion of the insulating material of the electrical conductor.

To improve the cooling of the electrical conductor, a plurality of cooling pipes is provided about the electrical conductor. In this way, portions of the external surface of the cooling pipes are provided in direct contact with corresponding portions of the insulating material of the electrical conductor. The contact between the cooling pipe(s) and the electrical conductor creates a heat transfer region where the heat generated at the electrical conductor is transferred via the external surface of the cooling pipe to the coolant medium circulated in the interior channel of the cooling pipe.

To further improve the cooling of the electrical conductor and further extend the surface area of the heat exchange region, a thermal interface material (TIM) is provided. The TIM is configured to surround the electrical conductor and the cooling pipes, thereby thermally coupling portions of the external surface of the plurality of cooling pipes with corresponding portions of the insulating material of the electrical conductor that are not in direct contact with one another. As a result, the TIM is configured to extend the heat exchange region between the electrical conductor and the cooling pipes, such that heat generated from the electrical conductor is more efficiently transferred to the coolant medium circulating in the plurality of cooling pipes. As a result, the use of TIM further improves the cooling of the electrical conductor.

The cooling pipes, the electrical conductor, and the TIM are collectively referred to as the power cable core, which is surrounded by an insulating layer.

According to embodiments of the present invention, wherein the plurality of cooling pipes comprises at least two longitudinally extending cooling pipes arranged on opposite sides of the electrical conductor. The number of cooling pipes provided around the electrical conductor may be adjusted depending on the heat dissipation needs of the application and the dimensions of the electrical conductor. For example, more cooling pipes may be used to improve the electrical power transmission efficiency of the power cable.

According to embodiments of the present disclosure, the plurality of cooling pipes extends between the coolant inlet and coolant outlet, which are positioned on opposite ends of the power cable assembly.

According to embodiments of the present invention, the plurality of cooling pipes is circumferentially spaced about the electrical conductor.

According to embodiments of the present disclosure, the plurality of cooling pipes is separated by a portion of the thermal interface material (TIM).

It has been found that providing the cooling pipes around the electrical conductor improves heat dissipation from the electrical conductor to the coolant medium in the cooling pipes. The cooling pipes are not necessarily evenly spaced but rather distributed evenly about the circumference of the electrical conductor. The cooling pipes may be separated from one another by a portion of the thermal interface material. In some embodiments, the cooling pipes may be in contact with one another.

According to embodiments of the present disclosure, each of the plurality of cooling pipes is made from a flexible polymer material.

According to embodiments of the present disclosure, the thickness of the thermally conductive wall of each cooling pipe is between 0.5 mm and 2.0 mm.

According to embodiments of the present disclosure, the insulating layer is arranged to apply a compressive force on the power cable core, causing the thermally conductive wall of each of the cooling pipes to elastically deform so as to extend the heat transfer region between the plurality of cooling pipes and electrical conductor.

The thermally conductive wall of the cooling pipes may be configured to be elastically deformed when a compressive force is applied. For example, the insulating material, also referred to as insulated jacket, provided around the power cable core may be arranged to compress the power cable core so as to prevent relative movement of the cooling pipes and the electrical conductor. As a result, due to the compressive force applied by the insulating layer and the flexible nature of the cooling pipe(s), the thermally conductive wall of each cooling pipe may be elastically deformed. The elastic deformation of the cooling pipe(s) would increase the contact area at the heat exchange region between the cooling pipes and the electrical conductor, thereby improving dissipation of the heat generated at the electrically conductive core to the coolant medium circulating in the interior channel of the cooling pipes.

According to embodiments of the present invention, wherein the plurality of cooling pipes has a tubular or cylindrical form.

The cooling pipe(s) may be provided with a round or an oval shape, which, when compressed, may assume a shape that conforms to the curvature of the corresponding surfaces of the electrical conductor in which the cooling pipe(s) are in direct contact. The thickness of the thermally conductive wall of the cooling pipe(s) may be adjusted so as to ensure sufficient flexibility and heat transfer properties without compromising safety.

According to embodiments of the present invention, wherein the electrical conductor comprises a shielding layer surrounding the inner insulating layer and an outer insulating layer surrounding the shielding layer. The electrical conductor may be in the form of an insulated busbar having a cylindrical or tubular form, but other shapes may be considered depending on the application, such as rectangular, square, and the like.

According to embodiments of the present invention, wherein the thermal interface material (TIM) comprises any one of: a potting material, a grease material, a paste material, a semi-solid material, or a phase-change material.

The TIM may be any suitable material, such as phase change materials, gap fillers, thermal grease, thermal interface film and the like. The TIM may be provided in a variety of forms, such as liquid, paste, film, and the like. Furthermore, the TIM may be cured under desired conditions so as to create a solid core. The TIM is thermally coupled to the external surfaces of the plurality of cooling pipes and the electrical conductor therein to improve heat exchange between the electrical conductor and the cooling pipe(s), thereby improving the efficiency of the power cable assembly.

According to a second aspect of the present disclosure, a cooling system is configured for coupling to a power cable assembly as described above for circulating a cooling medium between the coolant inlet and the coolant outlet of the interior channel of the cooling pipes. The cooling system includes a pump, a cooling unit, and one or more connectors for connecting the coolant inlet and coolant outlet to the cooling system. The coolant medium is circulated, via the cooling unit, through the interior channel of the cooling pipes between the coolant inlet and the coolant outlet.

The coolant inlet and the coolant outlet are connected, via one or more connectors, to a cooling system provided in fluid communication with the power cable assembly. The cooling system is provided as a closed-loop coolant circulation system. The cooling unit is configured to extra the heat from the coolant medium exiting the coolant outlet.

According to embodiments of the present disclosure, the coolant medium is a water-based fluid. Since portions of the cooling tube are provided in contact with the insulating layer of the busbar, different types of coolant mediums may be used, such as non-dielectric coolant mediums. For example, the coolant medium provided in the coolant tube may be a water-based coolant such as water and glycol mixture. Equally, the coolant medium may be a dielectric coolant such as oil-based fluid or another suitable dielectric coolant.

According to a third aspect of the present disclosure, a power distribution system of a vehicle is provided comprising a power cable assembly as described above extending between first and second end contact surfaces configured for coupling, via first and second connectors, to respective electrical connections of the power distribution system and the integrated cooling system described above, coupled to the power cable assembly, for circulating the cooling medium between the coolant inlet and coolant outlet of the interior channel of the cooling pipes.

To ensure that the power cable can be integrated into a system such as a vehicle power distribution system, the power cable assembly may be shaped into the desired shape to enables easy integration for the desired application.

BRIEF DESCRIPTION OF THE DRAWINGS

The present invention is now described, by way of example with reference to the accompanying drawings, in which.

DETAILED DESCRIPTION

Figure 1:
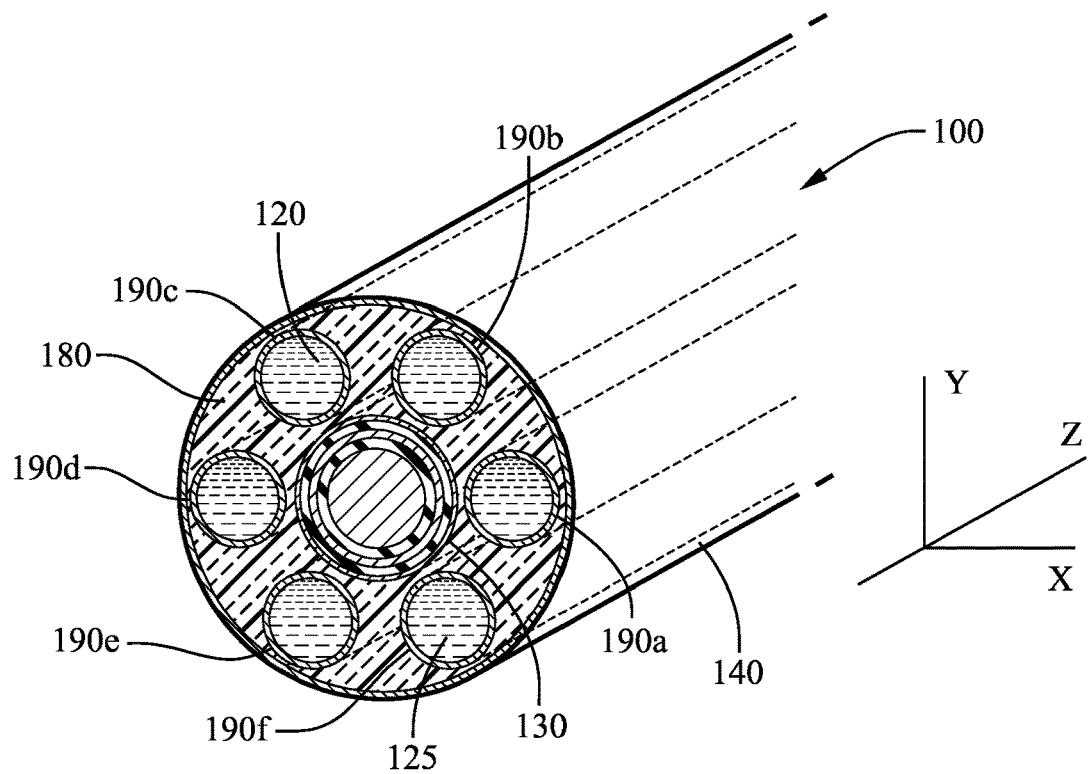
FIG. 1 is a perspective view of an exemplary power cable assembly according to embodiments of the present disclosure.

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

For simplicity and clarity of illustration, reference numerals may be repeated among the Figures to indicate corresponding or analogous elements. Numerous details are set forth to provide an understanding of the examples described herein. The examples may be practised without these details. In other instances, well-known methods, procedures, and components are not described in detail to avoid obscuring the examples described. The description is not to be considered as limiting to the scope of the examples described herein.

Figure 4:
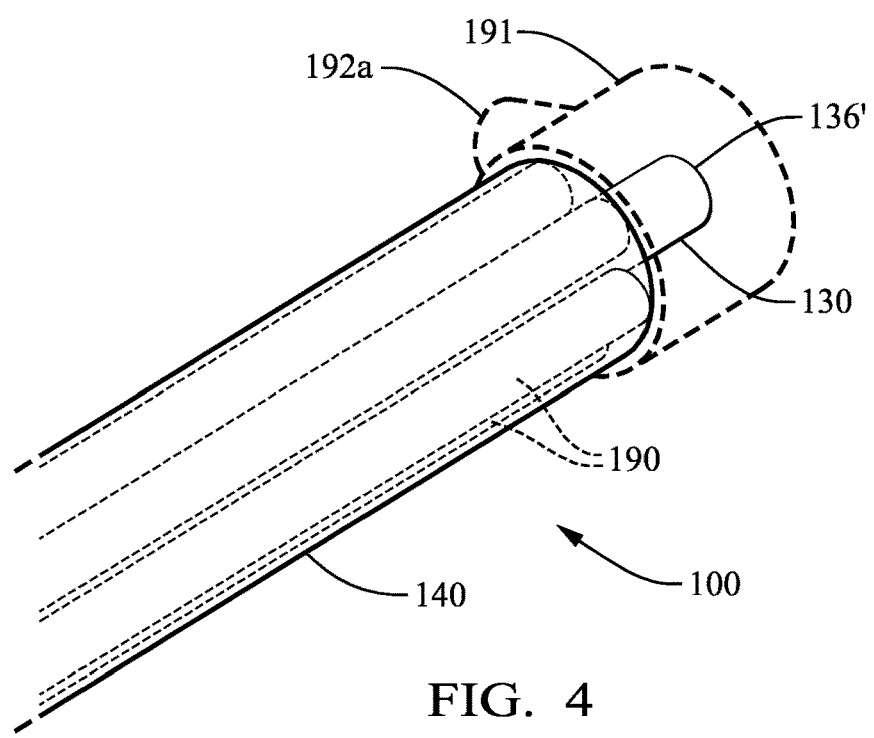
FIG. 4 is a perspective view of an exemplary power cable assembly with a connector at a second end according to embodiments of the present disclosure.
Figure 5:
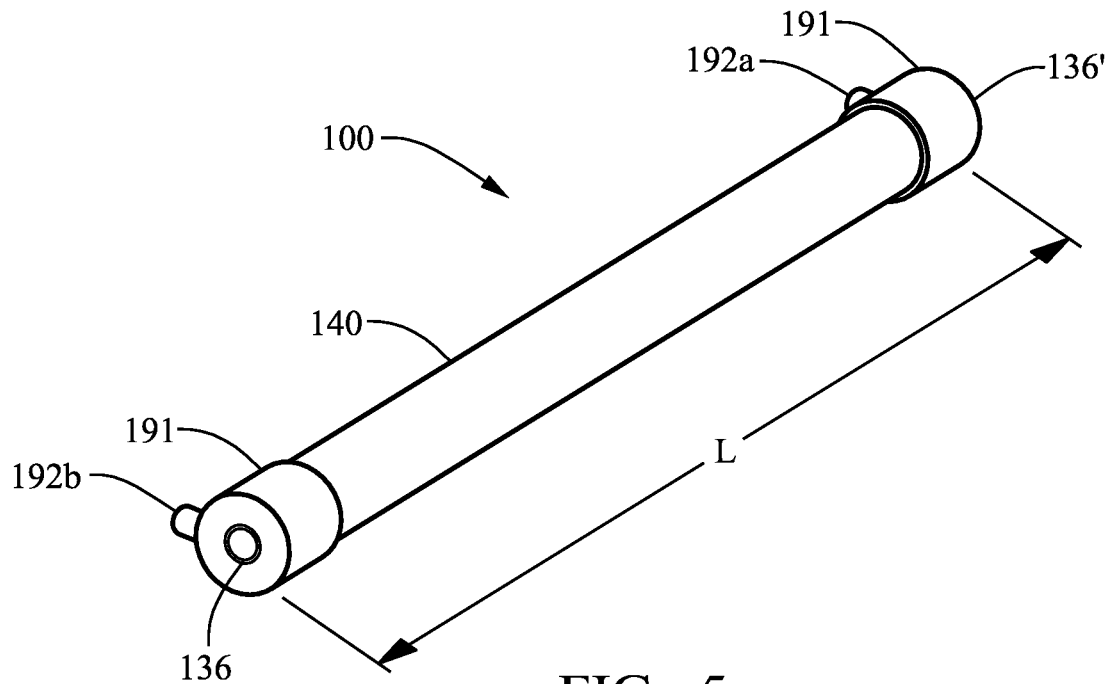
FIG. 5 is a perspective view of an exemplary power cable assembly with a connector at a first end and a connector at a second end according to embodiments of the present disclosure.
Figure 6:
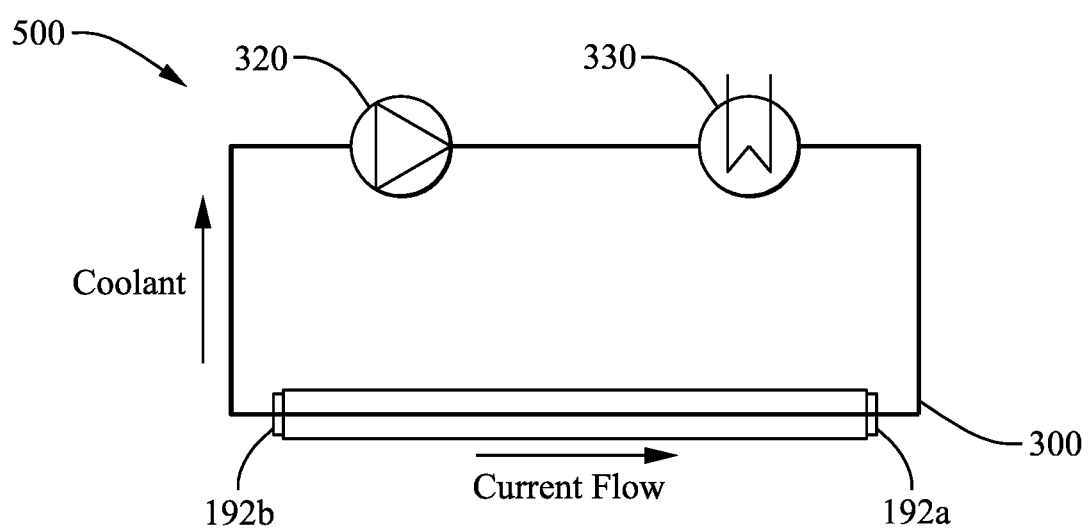
FIG. 6 is a block diagram illustrating in block diagram form of an exemplary power cable assembly according to FIG. 1 coupled to an exemplary coolant system according to embodiments of the present disclosure.
Figure 7:
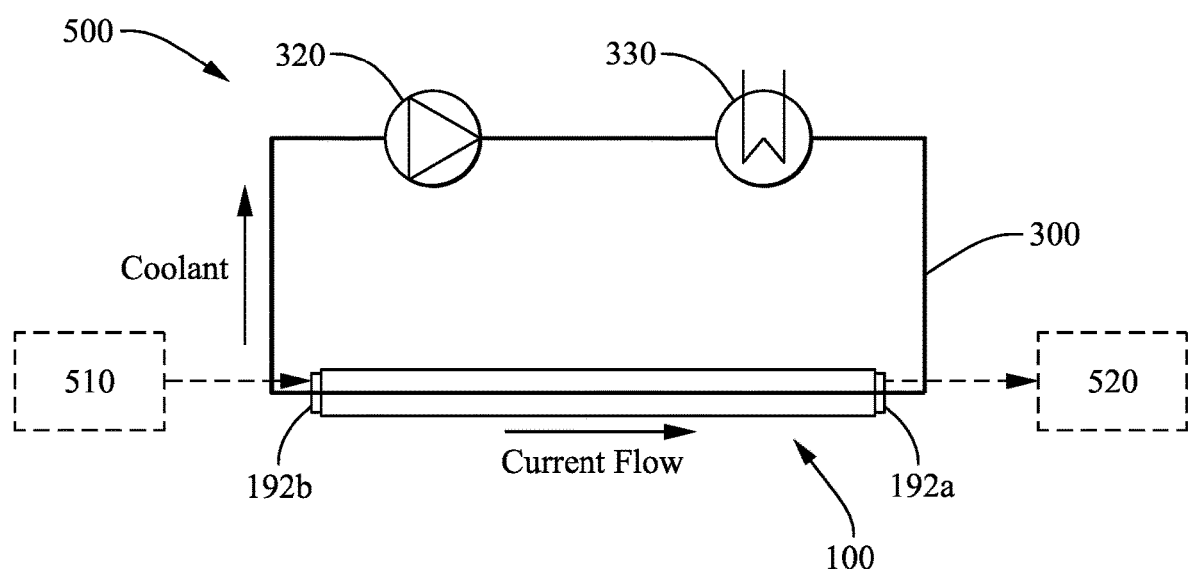
FIG. 7 is a block diagram illustrating in block diagram form of an exemplary power cable charging system comprising an integrated cooling system according to embodiments of the present disclosure.

FIGS. 1 to 5 show an exemplary power cable assembly 100 according to embodiments of the present disclosure. The power cable assembly 100 comprises a power cable core 170 comprising an electrical conductor 130, a plurality of cooling pipes 190, a thermal interface material, TIM, 180 surrounding the cooling pipes 190 and the electrical conductor 130, and an insulating layer 140, also referred to as an insulation jacket, surrounding the power cable core 170. The power cable assembly 100 has a longitudinal axis that extends in the z-direction, as illustrated in FIG. 1, between first and second ends thereof. The electrical conductor comprises an electrically conductive core 133 surrounded by an inner insulating layer 131. The electrical conductor 130 may be an unshielded conductor or a shielded conductor. In the shielded configuration, the electrical conductor 130 comprises a shielding layer 134 surrounding the inner insulating layer 131 and an outer insulating layer 135 surrounding the shielding layer 134. The shielding layer 134 may be a braided shielding layer. However, it will be appreciated that any suitable alternative shielding may be used. The electrical conductor 130 extends longitudinally between a first contact end surface and a second end contact surface 136' provided at opposing ends of the power cable assembly 100. The contact surfaces 136 and 136' are conducting surfaces configured to be coupled, via first and second connectors, to respective electrical connections of a power distribution system, e.g., a vehicle power distribution system. The power cable assembly 100 is also configured for coupling via first and second connectors 191 to a cooling system 300, which may be provided as part of a power distribution system 500 to which the power cable assembly 100 is connected, as shown in FIGS. 6 and 7.

Figure 2:
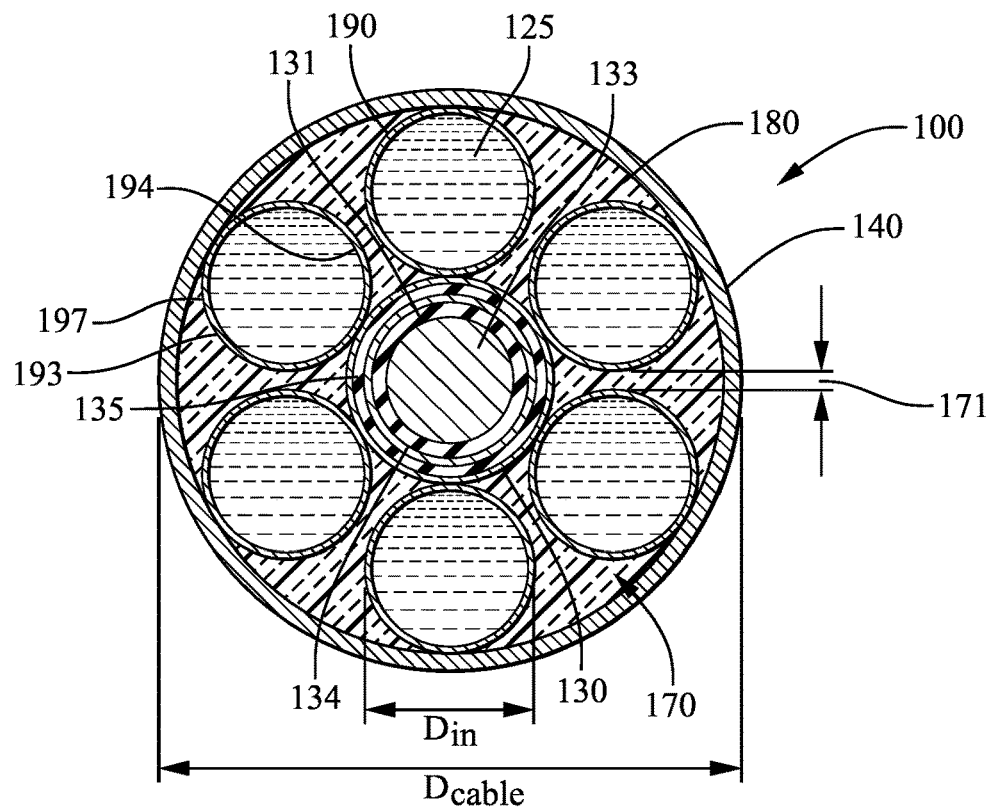
FIG. 2 provides a transverse cross-sectional view of the power cable assembly of FIG. 1.

A plurality of cooling pipes 190a-190f, collectively represented by reference 190, are provided circumferentially about the electrical conductor 130 and extending longitudinally along the length of the electrical conductor 130. Each cooling pipe 190 comprises a thermally conductive wall 197 defining an internal surface 194 and an external surface 193. The internal surface 194 of the cooling pipes 190 defines an interior channel 120 for circulating a coolant medium 125 between a coolant inlet 192a and a coolant outlet 192b. A portion of the external surface 193 of the thermally conductive wall 197 of each cooling pipe 190 is configured to be in direct contact with a corresponding portion of an external surface of the electrical conductor 130 over a heat exchange region, as shown in FIGS. 1 and 2. For example, depending on the configuration of the electrical conductor 130, shielded or unshielded, the external surface of the electrical conductor may be the inner insulating layer 131 or outer insulating layer 135. The contact between the portion of the external surfaces 193 of the cooling pipes 190 and corresponding portions of the electrical conductor 130 create a heat exchange region, whereby heat generated at the electrical conductor is transferred to the coolant medium 125 circulating in the interior channel 120 of each cooling pipe 190.

The external surface of the electrical conductor 130 is a heat transfer surface. The external surface 131 is arranged to be in direct contact with the external surface 193 of the cooling pipe(s) 190 and the thermal interface material 180 such that heat is transferred from the electrical conductor 130 to the coolant medium 125. As a result, heat generated in the electrical conductor 130, as an electrical current passes through the electrically conductive core 133, is transferred via the thermally conductive wall 197 of each cooling pipe 190 to the coolant medium 125 circulating therein The power cable assembly 100 and the electrical conductor 130 has a generally cylindrical form and extends radially about their longitudinal axis. As illustrated, in the transverse cross-section (X-Y plane with reference to FIG. 5), the power cable assembly 100 and the electrical conductor 130 are generally of circular form or ring form. It will, however, be appreciated that while the electrical conductor 130 of the exemplary arrangements of the drawings has a generally circular or ring form in cross-section, an electrical conductor 130 of other suitable forms may also be used. The electrical conductor 130 may, for example, have an oval form in cross-section. The electrical conductor 130 may be an insulated busbar having a tubular or pipe form.

As illustrated in FIG. 2, the interior channel 120 of the cooling pipe(s) 190 has a diameter Din, which together with the radius, and the length of the cooling pipe(s) 190 defines the volume, Vchannel, of the interior channel 120 of the cooling pipe(s), indicating the volume of coolant medium 125 that can be received therein, and the surface area of the interior channel 120 of each cooling pipe 190. The electrical conductor 130 has a length L in the longitudinal direction, as shown in FIG. 5.

The form and dimensions of the electrical conductor 130 and the volume, form, and dimensions of the interior channel 120 of the cooling pipe(s) 190 may be varied and selected to provide the required levels of cooling for the power cable assembly 100. The area of the inner insulating layer 131 of the electrical conductor 130, which defines the heat transfer surface, may also be varied depending on the needs of the application.

To further improve heat dissipation between the electrical conductor 130 and the cooling pipes, the power cable core 170 is provided with the thermal interface material, TIM, 180, as shown in FIGS. 1 and 2. The TIM 180 surrounds the cooling pipes 190 and the electrical conductor 130. As a result, the TIM 180 thermally couples the external surfaces 193 of the plurality of cooling pipes 190 with the external surface 131 of the electrical conductor 130 such that heat generated from the electrical conductor 130 is transferred to the coolant medium 125 circulating in the cooling pipes 190. The TIM 180 is configured to extend the heat transfer area available for transferring heat from the electrical conductor 130 to the cooling pipe(s) 190, thereby further improving the cooling of the electrical conductor 130. The TIM 180 may be any suitable material, such as phase change materials, gap fillers, thermal grease, thermal interface film and the like. The TIM 180 may be provided in a variety of forms, such as liquid, paste, film, and the like. Furthermore, the TIM 180 may be cured under desired conditions so as to create a solid core. As shown in FIG. 2, the cooling pipes 190, in this case, six cooling pipes 190 are provided, are circumferentially spaced about the electrical conductor 130 by a portion of the TIM 180. Space 171 provided between the adjacent cooling pipes 190 is not necessarily equal. Preferably, the cooling pipes 190 are distributed evenly around the circumference of the electrical conductor 130 to improve the transfer of heat. Depending on the application, the cooling pipes 190 may also be arranged to be in direct contact with one another.

The provision of the thermal interface material 180 in direct contact with the external surface 131 or 135 of the electrical conductor 130 and the external surface 193 of the cooling pipe(s) 190 improves heat dissipation from the electrically conductive core 133 to the coolant medium 125.

The power cable assembly 100 of the present disclosure may be configured for delivering high current loads between electrical connections of a power distribution system 500.

The cooling pipes 190 of the power cable assembly 100 may be made from a flexible polymer material such as synthetic rubber or similar. The thickness of the thermally conductive wall 197 of each cooling pipe 190 may be between 0.5 mm and 2.0 mm.

As shown in FIGS. 1 to 5, the power cable assembly 100 comprises an insulating layer 140, e.g., in the form of an insulating jacket, provided around the plurality of cooling pipes 190. The insulating layer 140 is configured to apply a compressive force on the cooling pipes 190 to prevent relative movement of the cooling pipes 190. The insulating layer 140 further insulate the power cable core 170 and maintains the TIM 180 in place around the cooling pipes 190 and electrical conductor 130. The compressive force applied by the insulating layer 140 causes the flexible cooling pipes 190 to elastically deform, thereby extending the portion of the external surface 193 of the cooling pipe 190 that is provided in direct contact with an external surface of the electrical conductor 130.

Figure 3:
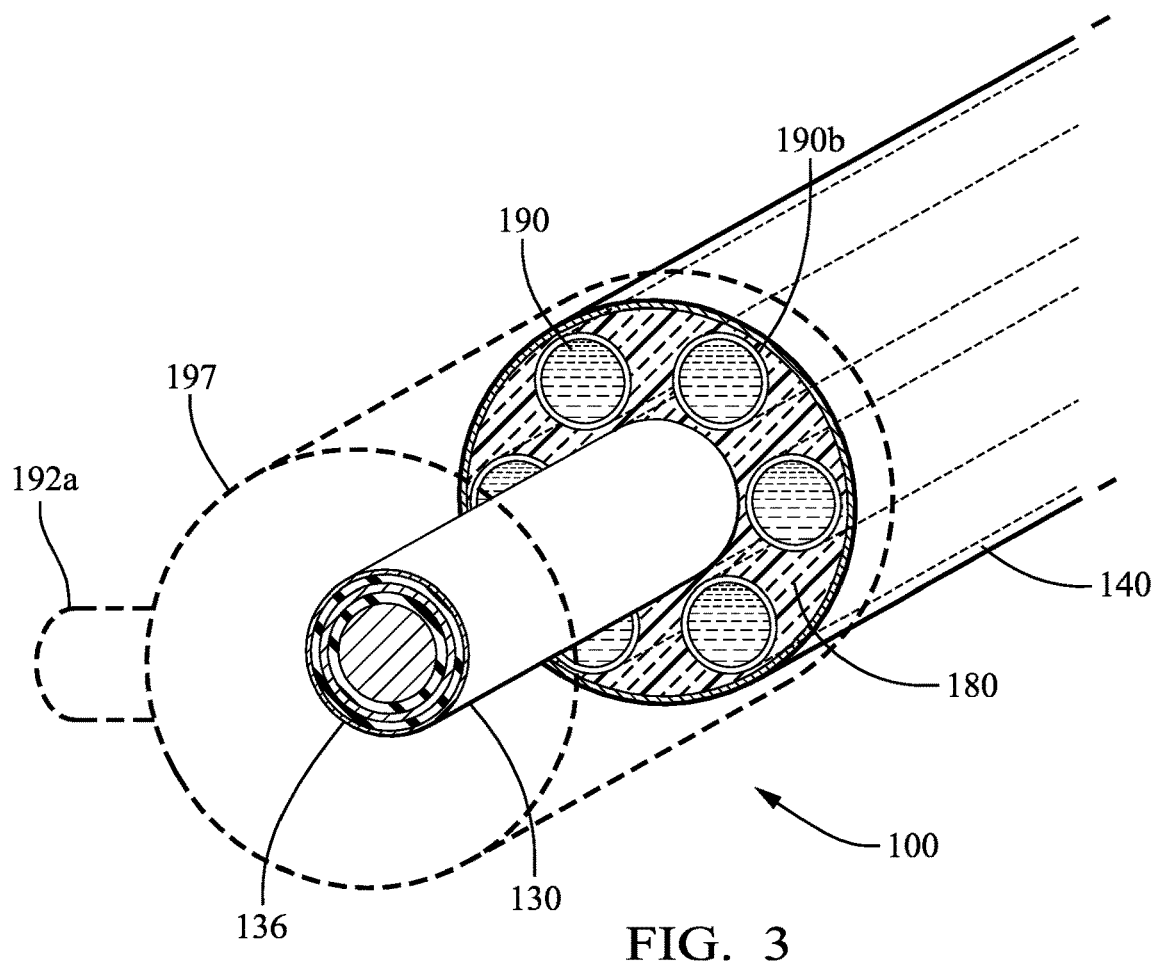
FIG. 3 is a perspective view of an exemplary power cable assembly with a connector at a first end according to embodiments of the present disclosure.

As shown in FIGS. 3 to 5, at the coolant inlet 192a and coolant outlet 192b of the power cable assembly 100, a manifold may be provided to allow the power cable assembly 100 to be coupled to a cooling system 300 of a power distribution system 500, e.g., a power distribution system of an electric vehicle.

Since the cooling pipes 190 are in direct contact with the inner insulating layer 131 of the electrical conductor 130, different types of coolant mediums may be used, such as non-dielectric coolant mediums. The coolant medium 125 is configured to be used and circulated in the interior channel 120 defined in the cooling pipes 190. The coolant medium 125 may be a water-based coolant such as water and glycol mixture. Equally, the coolant medium 125 may be a dielectric coolant such as an oil-based coolant and the like.

Referring to FIGS. 6 and 7, an exemplary power distribution system 500 comprising the power cable assembly 100 and an integrated cooling system 300 is described. The power cable assembly 100 is coupled to the cooling system 300. The cooling system 300 comprises a pump 320 and a cooling unit 330. The power cable assembly 100 is configured for connection to the cooling system 300.

In operation, the coolant medium 125 is circulated through the interior channel 120 of the cooling pipe(s) 190 of the power cable assembly 100, between the coolant inlet 192a and a coolant outlet 192b of the cooling system 300. In the exemplary arrangement of FIG. 6, the coolant inlet 192a and coolant outlet 192b are located at opposite ends of the power cable assembly 100. The cooling system 300 is a closed-loop coolant circulation system. The coolant medium 125 is circulated by the pump 320 through the interior channel 120 of the cooling pipe(s) 190, between the inlet 192a and outlet 192b of the cooling system 300 and via the cooling unit 330.

FIG. 7 shows an exemplified power distribution system 500 comprising the integrated cooling system 300 presented with reference to FIG. 6.

The power distribution system and the power cable assembly are configured for connection between a first electrical connection 510 and a second electrical connection 520, e.g., between a battery and an electrical system of a vehicle. As described above, the first and second end surfaces 136 and 136' of the electrical conductor 130 of the power cable assembly 100 are configured for coupling via first and second connectors to a node of the first and second electrical connections 510 and 520, respectively. Similarly, the coolant inlet 192a and outlet 192b, which the coolant medium 125 is circulated, is configured for coupling to the cooling system 300 via one or more connectors 191, as previously described with reference to FIGS. 3 to 5.

During the operation of the power distribution system 500, as current flows through the electrical conductor 130 of the power cable assembly 100, an amount of heat will be generated. The coolant medium 125 is circulated via pump 320 through the cooling pipe(s) 190 to absorb the heat transferred from the electrically conductive core 133 to the coolant medium via the heat exchange region. The heated coolant medium 125 exiting the interior channel 120 is directed to the cooling unit 330, where the heat from the coolant medium 125 is extracted, and the coolant medium 125 is fed back to the interior channel 120 via the coolant inlet 192a.

The electrical conductor 130 of one arrangement is a high voltage power cable. The electrical conductor may be, such as but not limited to, any power cable used within a vehicle for distributing high current within the vehicle. The cooling pipe(s) 190 define an interior channel(s) 120 between a first opening and a second opening at opposing ends of the power cable assembly 100.

The specification provides power cable assembly arrangements and power distribution system arrangement comprising a power cable assembly and integrated cooling system, which advantageously provide improved cooling and improved heat transfer from a conductor to a coolant to provide improved operation. The arrangements of the specification provide solutions to the problems associated with large amounts of heat generated on a typical power distribution or cable charging system, including, for example, a harness or a high voltage power assembly, during charging of an electric vehicle. Providing a plurality of flexible cooling pipes 190 around the electrical conductor 130, as described and defined in the claims, provides improved cooling and heat transfer to maintain the high voltage system at the required safe levels of operating temperature.

While the power distribution system 500 and power cable assembly 100 of the present disclosure have been described in terms of the preferred embodiments thereof, they are not intended to be so limited, but rather only to the extent set forth in the claims that follow. While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A power cable assembly, comprising:
a power cable core; and
an insulating layer surrounding the power cable core, wherein the power cable core further comprises:
an electrical conductor extending longitudinally, the electrical conductor comprising an electrically conductive core surrounded by an insulating material,
a plurality of longitudinally extending cooling pipes, each cooling pipe comprising a thermally conductive wall defining an interior channel for circulating, between a coolant inlet and a coolant outlet of the cooling pipes, a coolant medium, and
a thermal interface material (TIM) surrounding the cooling pipes and the electrical conductor, wherein the TIM is configured to thermally couple an external surface of the thermally conductive wall of each cooling pipe with an external surface of the insulating material of the electrical conductor such that heat generated at the electrical conductor is transferred, via the external surface of the cooling pipes over a heat transfer region, to the coolant medium circulating in the interior channel, wherein the plurality of cooling pipes is arranged about the electrical conductor such that a portion of an external surface of the thermally conductive wall of each cooling pipe is in direct contact with a corresponding portion of the insulating material of the electrical conductor and wherein the insulating layer is arranged to apply a compressive force on the power cable core, thereby causing the thermally conductive wall of each cooling pipe to elastically deform.

2. The power cable assembly according to claim 1, wherein the plurality of cooling pipes comprise at least two cooling pipes arranged on opposite sides of the electrical conductor.

3. The power cable assembly according to claim 1, wherein the plurality of cooling pipes extends between the coolant inlet and coolant outlet, which are positioned on opposite ends of the power cable assembly.

4. The power cable assembly according to claim 1, wherein the plurality of cooling pipes is circumferentially spaced about the electrical conductor.

5. The power cable assembly according to claim 1, wherein the plurality of cooling pipes is separated by a portion of the TIM.

6. The power cable assembly according to claim 1, wherein each of the plurality of cooling pipes is made of a flexible polymer material.

7. The power cable assembly of claim 6, wherein a thickness of the thermally conductive wall of each cooling pipe is between 0.5 mm and 2.0 mm.

8. The power cable assembly according to claim 1, wherein the insulating layer is arranged to apply a compressive force on the power cable core causing the thermally conductive wall of each cooling pipe extends the heat transfer region between the plurality of cooling pipes and the electrical conductor.

9. The power cable assembly according to claim 1, wherein the cooling pipes have a tubular or cylindrical form.

10. The power cable assembly according to claim 1, wherein the electrical conductor comprises a shielding layer surrounding an inner insulating layer and an outer insulating layer surrounding the shielding layer.

11. The power cable assembly according to claim 1, wherein the electrical conductor is an insulated busbar having a cylindrical cross-sectional profile.

12. The power cable assembly according to claim 1, wherein the thermal interface material (TIM) is selected from a list consisting of: a potting material, a semi-solid material, and a phase-change material.

13. A cooling system, comprising:
the power cable assembly according to claim 1;
a pump;
a cooling unit; and
one or more connectors for connecting the coolant inlet and the coolant outlet to the cooling system, wherein the coolant medium is circulated, via the cooling unit, through the interior channel of the cooling pipes between the coolant inlet and the coolant outlet.

14. The cooling system according to claim 13, wherein the coolant medium is a water-based fluid.

15. A power distribution system of a vehicle, comprising:
the power cable assembly according to claim 1 extending between first and second end contact surfaces configured for coupling, via first and second connectors, to respective electrical connections of the power distribution system; and
an integrated cooling system, further comprising:
a pump;
a cooling unit; and
one or more connectors for connecting the coolant inlet and the coolant outlet to the cooling system, wherein the coolant medium is circulated, via the cooling unit, through the interior channel of the cooling pipes between the coolant inlet and the coolant outlet, coupled to the power cable assembly for circulating the cooling medium between the coolant inlet and the coolant outlet of the interior channel of the cooling pipes.

16. The power cable assembly according to claim 1, whereby the elastic deformation of the thermally conductive wall of each cooling pipe extends the portion of the external surface of each cooling pipe that is in direct contact with an external surface of the electrical conductor.

17. The power cable assembly according to claim 10, wherein the inner insulating layer is in direct contact with the cooling pipes.

* * * * *